(12) United States Patent
Fralick et al.

(10) Patent No.: US 11,847,215 B2
(45) Date of Patent: Dec. 19, 2023

(54) MODEL DEVELOPMENT AND APPLICATION TO IDENTIFY AND HALT MALWARE

(71) Applicant: McAfee, LLC, San Jose, CA (US)

(72) Inventors: Celeste R. Fralick, Lubbock, TX (US); Jonathan King, Forest Grove, OR (US); Carl D. Woodward, San Jose, CA (US); Andrew V. Holtzmann, Aurora, CO (US); Kunal Mehta, Hillsboro, OR (US); Sherin M. Mathews, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 386 days.

(21) Appl. No.: 17/133,228

(22) Filed: Dec. 23, 2020

(65) Prior Publication Data

US 2021/0157913 A1 May 27, 2021

Related U.S. Application Data

(63) Continuation of application No. 15/967,024, filed on Apr. 30, 2018, now Pat. No. 10,956,568.

(51) Int. Cl.
*G06F 21/56* (2013.01)
*G06F 21/60* (2013.01)
*H04L 9/30* (2006.01)

(52) U.S. Cl.
CPC ............ *G06F 21/56* (2013.01); *G06F 21/602* (2013.01); *H04L 9/30* (2013.01); *G06F 2221/034* (2013.01)

(58) Field of Classification Search
CPC .. G06F 21/56; G06F 21/602; G06F 2221/034; G06F 21/566; G06F 21/554; H04L 9/30; H04L 63/145
See application file for complete search history.

(56) References Cited

U.S. PATENT DOCUMENTS 9,330,264 B1 * 5/2016 Hutton .................... G06F 21/53
10,956,568 B2   3/2021 Fralick et al.
(Continued)

OTHER PUBLICATIONS

United States Patent and Trademark Office, "Final Office Action," issued in connection with U.S. Appl. No. 15/967,024, dated Jun. 23, 2020, 12 pages.

(Continued)

*Primary Examiner* — Joseph P Hirl
*Assistant Examiner* — Thomas A Gyorfi
(74) *Attorney, Agent, or Firm* — HANLEY, FLIGHT & ZIMMERMAN, LLC

(57) ABSTRACT

A method for halting malware includes: monitoring plural file system events with a system driver to detect an occurrence of a file system event having a predetermined file type and log event type; triggering a listening engine for file system event stream data of a file associated with the detection of the file system event, the file system event stream data indicating data manipulation associated with the file due to execution of a process; obtaining one or more feature values for each of plural different feature combinations of plural features of the file based on the file system event stream data; inputting one or more feature values into a data analytics model to predict a target label value based on the one or more feature values of the plural different feature combinations and agnostic to the process; and performing a predetermined operation based on the target label value.

20 Claims, 7 Drawing Sheets

(56) References Cited

U.S. PATENT DOCUMENTS

| | | |
|---|---|---|
| 2017/0177867 A1 | 6/2017 | Crofton et al. |
| 2017/0339178 A1* | 11/2017 | Mahaffey .............. H04L 41/142 |
| 2018/0018458 A1 | 1/2018 | Schmugar et al. |
| 2018/0034835 A1* | 2/2018 | Iwanir ................... G06F 21/565 |
| 2018/0107824 A1 | 4/2018 | Gibbons, Jr. et al. |
| 2018/0115577 A1 | 4/2018 | Shukla et al. |
| 2018/0157831 A1* | 6/2018 | Abbaszadeh ......... G06F 21/552 |
| 2018/0189490 A1 | 7/2018 | Maciejak et al. |

OTHER PUBLICATIONS

United States Patent and Trademark Office, "Non-Final Office Action," issued in connection with U.S. Appl. No. 15/967,024, dated Dec. 30, 2019, 9 pages.

United States Patent and Trademark Office, "Notice of Allowance," issued in connection with U.S. Appl. No. 15/967,024, dated Sep. 22, 2020, 7 pages.

International Searching Authority, "Search Report and Written Opinion," issued in connection with International Patent Application No. PCT/US2019/029962, dated Jun. 13, 2019, 13 pages.

International Searching Authority, "Written Opinion," issued in connection with International Application No. PCT/US2019/029962, dated Nov. 3, 2020, 8 pages.

* cited by examiner

500

| No. | Feature Canidates |
|---|---|
| 1 | File original size |
| 2 | File original entropy |
| 3 | File original chi^2 distribtuion |
| 4 | File original monte carlo pi estimation error |
| 5 | File original arithmetic mean |
| 6 | File original serial correlation coefficient |
| 7 | Has the file been renamed? |
| 8 | Has the original file been deleted? |
| 9 | Amount of file size change from original |
| 10 | Original File starting 4K bits (features) |
| 11 | Original File ending 4K bit (features) |
| 12 | File ending size |
| 13 | File ending entropy |
| 14 | File ending chi^2 distribtuion |
| 15 | File ending monte carlo pi estimation error |
| 16 | File ending arithmetic mean |
| 17 | File ending serial correlation coefficient |
| 18 | Result File starting 4K bits (features) |
| 19 | Result File ending 4K bits (features) |
| 20 | File mtime-ctime |
| 21 | Is transforming program a default program? |
| 22 | Is transforming process parent process still running? |
| 23 | Is transforming process a child process? |
| 24 | Is transforming process the parent process? |
| 25 | Transforming process execution count? (windows prefetch) |
| 26 | Has the file type changed? |
| 27 | File starting fuzzy hash |
| 28 | File ending fuzzy hash |
| 29 | Fuzzy hash similarity |
| 30 | Structure of the file |
| 31 | Does the transforming program have user focus? |
| 32 | Process address space modification |
| 33 | Alternate data stream downloaded file bit |
| 34 | Parent Alternate data stream downloaded file bit |
| 35 | File ownership (NTFS access to file) |
| 36 | Is the process protected by SGX |

FIG. 5

| Effect Tests | | | | |
|---|---|---|---|---|
| Source | Nparm | DF | Wald ChiSquare | Prob > ChiSquare |
| mod_mvars_s4k_mcpi_10*mod_mvars_s4k_scc_11*mod_mvars_e4k_mcpi_15*mod_mvars_e4k_mcpie_16 | 1 | 1 | 25.393337 | <.0001* |
| mod_mvars_s4k_ent_8*mod_mvars_s4k_mcpi_9*mod_mvars_s4k_scc_11 | 1 | 1 | 17.239124 | <.0001* |
| mod_mvars_s4k_mcpi9*mod_mvars_s4k_scc_11*mod_mvars_e4k_mcpi_15*mod_mvars_e4k_mcpie_16 | 1 | 1 | 15.400719 | <.0001* |
| mod_mvars_s4k_ent_8*mod_mvars_s4k_mcpie_10*mod_mvars_s4k_scc_11 | 1 | 1 | 13.401361 | 0.0003* |
| mod_mvars_s4k_mcpi_9*mod_mvars_e4k_mcpi_15*mod_mvars_e4k_mcpi_scc_17 | 1 | 1 | 5.7103505 | 0.0169* |
| mod_mvars_s4k_mcpi_9*mod_mvars_e4k_mcpi_15*mod_mvars_e4k_mcpie_16 | 1 | 1 | 4.1156421 | 0.0425* |
| mod_mvars_s4k_mcpie_10*mod_mvars_s4k_scc_11*mod_mvars_e4k_scc_17 | 1 | 1 | 2.1527827 | 0.1423 |
| mod_mvars_s4k_mcpie_10*mod_mvars_e4k_mcpie_16*mod_mvars_e4k_scc_17 | 1 | 1 | 1.8035813 | 0.1793 |
| mod_mvars_s4k_mcpie_10*mod_mvars_s4k_scc_11*mod_mvars_e4k_ent_14*mod_mvars_e4k_scc_17 | 1 | 1 | | 0.4589 |
| mod_mvars_s4k_mcpi_9*mod_mvars_s4k_scc_11*mod_mvars_e4k_armn_12* | 1 | 1 | 0.5466852 | 0.5361 |
| mod_mvars_e4k_mcpi_15*mod_mvars_e4k_scc_17 | 1 | 1 | 0.3827323 | 0.5839 |
| mod_mvars_s4k_chisqr_7*mod_mvars_s4k_mcpie_10 | 1 | 1 | 0.2999632 | 0.5942 |
| mod_mvars_s4k_chisqr_7*mod_mvars_s4k_ent_8*mod_mvars_e4k_mcpi_15 | 1 | 1 | 0.283768 | 0.6767 |
| mod_mvars_s4k_ent_8*mod_mvars_s4k_mcpi_9*mod_mvars_s4k_mcpie_10*mod_mvars_s4k_scc_11*mod_mvars_e4k_ent_14*mod_mvars_e4k_mcpi_15 | 1 | 1 | 0.1739105 | 0.7432 |
| d_mvars_e4k_mcpie_16 | 1 | 1 | 0.1073607 | 0.8883 |
| mod_mvars_s4k_ent_8*mod_mvars_s4k_mcpie_10*mod_mvars_s4k_scc_11*mod_mvars_e4k_mcpie_16 | 1 | 1 | 0.0197318 | |

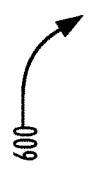

FIG. 6

MODEL DEVELOPMENT AND APPLICATION TO IDENTIFY AND HALT MALWARE

RELATED APPLICATION

This patent arises from a continuation of U.S. patent application Ser. No. 15/967,024, (Now U.S. Pat. No. 10,956, 568) which was filed on Apr. 30, 2018. U.S. patent application Ser. No. 15/967,024 is hereby incorporated herein by reference in its entirety. Priority to U.S. patent application Ser. No. 15/967,024 is hereby claimed.

TECHNICAL FIELD

Embodiments described herein generally relate to the field of cybersecurity and in particular to statistical techniques and data analytics for identifying and halting malware.

BACKGROUND ART

Malware is any software used to disrupt normal operation of a programmable device, gather sensitive information, or gain access to private systems or networks. Ransomware is malware that employs asymmetric encryption to hold a victim's information at ransom. Asymmetric (public-private) encryption is cryptography that uses a pair of keys to encrypt and decrypt a file. The public-private pair of keys is uniquely generated by the attacker for the victim, with the private key to decrypt the files stored on the attacker's server. The attacker makes the private key available to the victim only after the ransom is paid, though that is not always the case—as seen in recent ransomware campaigns. Without access to the private key, it is nearly impossible to decrypt the files that are being held for ransom. Majority of the most serious endpoint security incidences or compromises occur due to ransomware attacks. In recent years, the number of ransomware attacks worldwide has increased significantly and continues to increase at an alarming rate. Costs incurred by enterprises worldwide due to cryptomalware and ransomware continue to rise. All market segments have been victimized by ransomware, and cyber thieves have been estimated to gross significant profits.

Currently, identifying ransomware is typically performed as a family classification alone, using if/then or yes/no differentiators, decision trees with no correlation coefficients, or simply detecting an encrypted file. Often, these are too late in the process, and ransom must be paid. A better technique for detecting ransomware prior to a file being malignantly (permanently) changed (e.g., unauthorized encryption) with a high degree of accuracy would be desirable.

BRIEF DESCRIPTION OF DRAWINGS

FIG. 5 shows a table illustrating exemplary feature candidates used with statistical techniques for model development according to one or more embodiments disclosed herein.

FIG. 6 shows a table illustrating exemplary specific singular or combinatorial contributing features that are derived for specific file types and log event types according to one or more embodiments disclosed herein.

DESCRIPTION OF EMBODIMENTS

Figure 1:
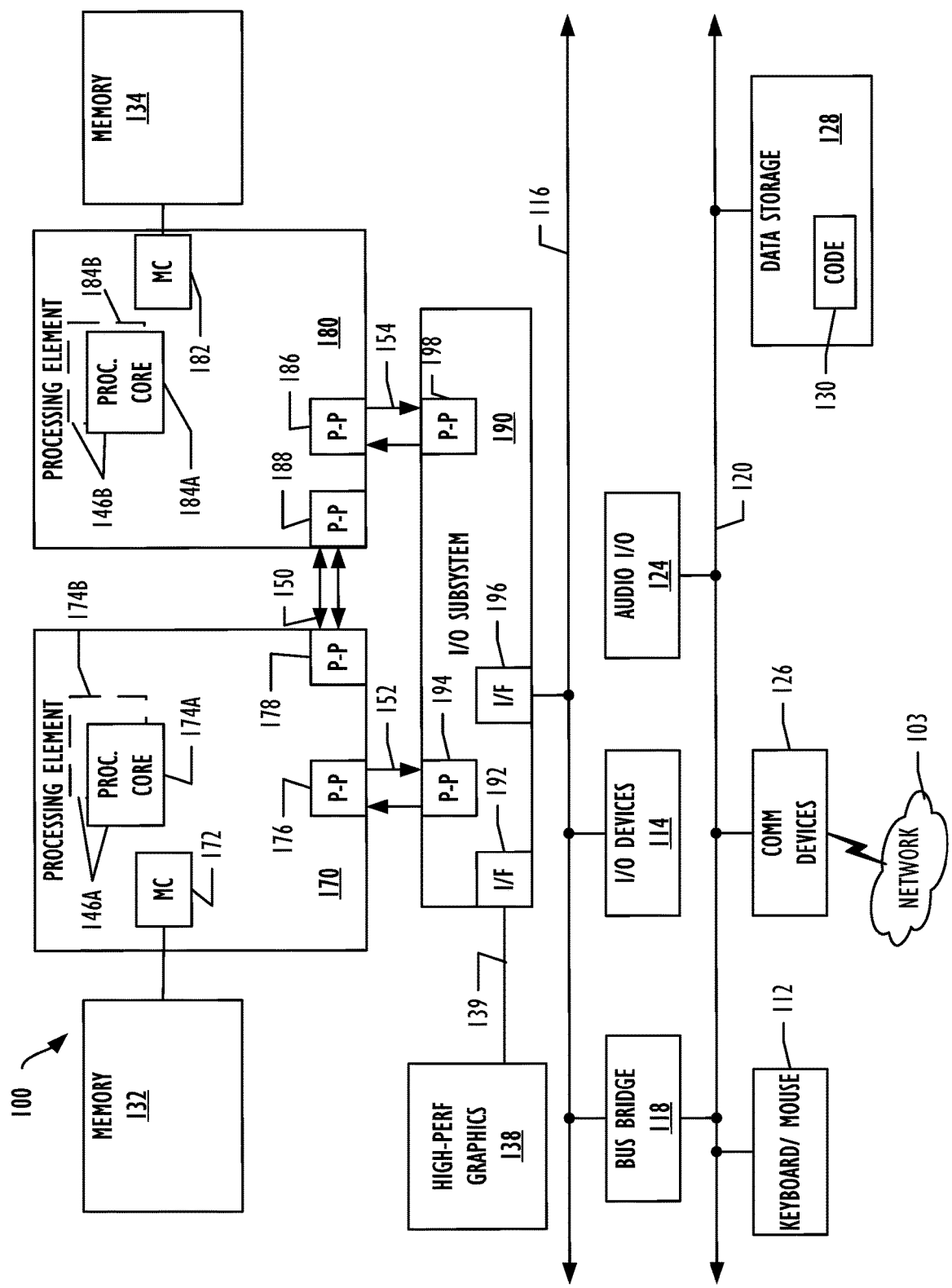
FIGS. 1-2 are block diagrams illustrating a computing device for use with techniques according to two or more embodiments disclosed herein.

In the following description, for purposes of explanation, numerous specific details are set forth in order to provide a thorough understanding of the inventions. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instances of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the inventions, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "processor" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processor to perform an action may program any or all of the processors to perform the indicated action. Where the processor is one or more multicore processors, instructions that when executed program the processor to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the memory. The memory may be any type of storage device, including random access memory, read-only memory, optical and electromechanical disk drives, etc.

This disclosure pertains to statistical techniques and data analytics to develop and apply a model that identifies and halts malware (e.g., ransomware) before the malware actually infects the system and malignantly changes a file (e.g., encrypts the file). Techniques disclosed herein employ a source agnostic approach to ransomware detection that is not based on any trust model of who the actor is. That is, instead of trusting or analyzing any actor (i.e., executing source or process) performing data manipulation, the actual data being manipulated (i.e., behavior) is analyzed and patterns deciphered from the mathematical transformations of the analyzed data to determine whether or not the behavior indicates, for example, that a file is being malignantly changed (e.g., ransomware attack), and if yes, a user may be prompted and changes to the file reverted before the modified version of the file 'hits disk' (i.e., overwrites the original version of the file on a storage device) or changes to the file restored by making a copy of the original version of the file before the file is modified and restoring the copy if the modified version is determined to be maliciously changed. By utilizing statistical techniques for novel specific singular or combinatorial contributing feature detection and utilizing data analytics for regression and machine learning applications, ransomware can be detected prior to malignant file change with a high degree of accuracy.

Figure 4:
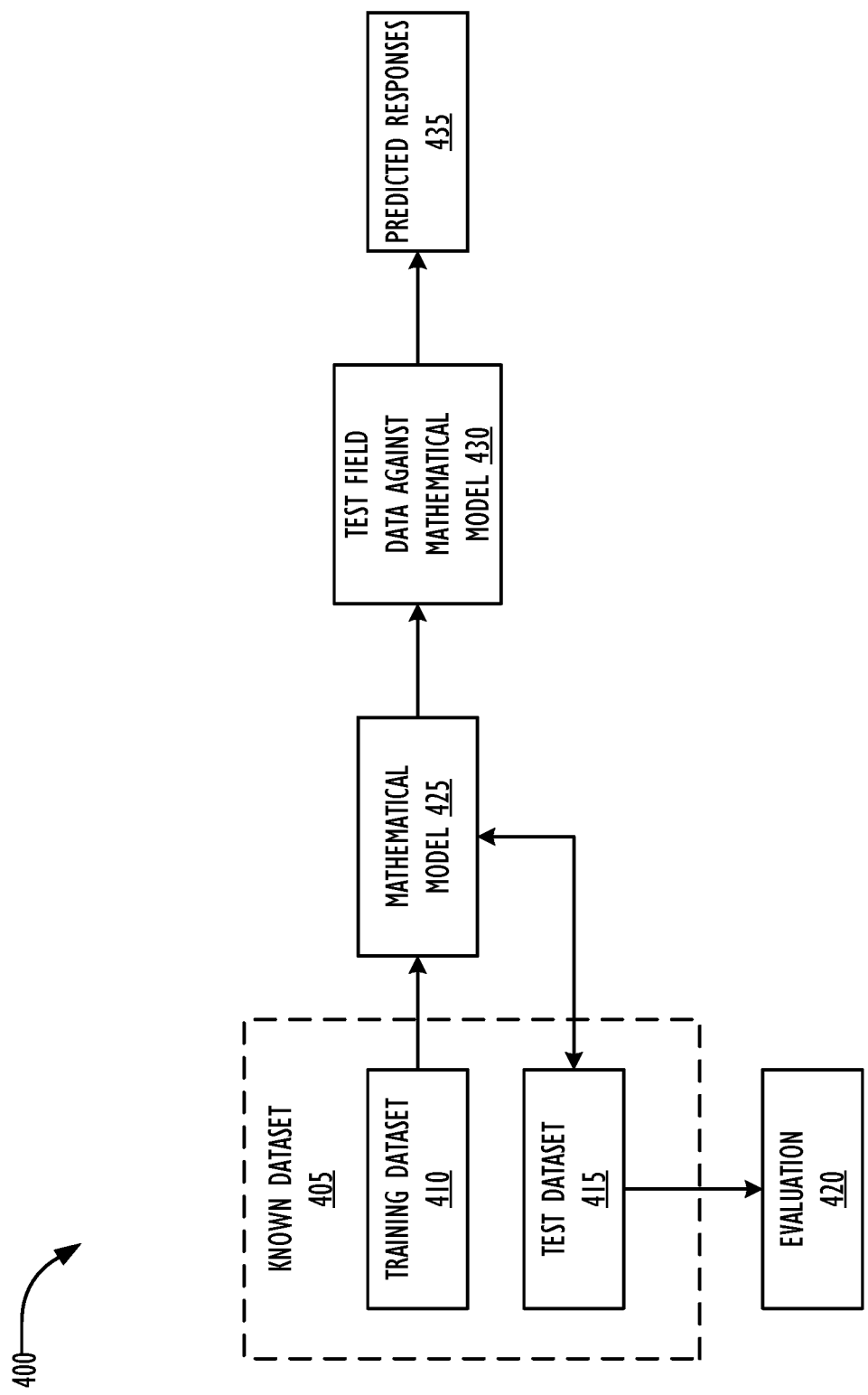
FIG. 4 shows a dataflow graph of model development and application for data analytics according to one or more embodiments disclosed herein.

Known dataset (e.g., dataset of known ransomware data and known 'normal' data; 405 in FIG. 4) including training dataset (410 in FIG. 4) and test dataset (415 in FIG. 4) is obtained for combinations of various file types (e.g., document file types, image file types, database file types, audio/video file types, and the like) and log event types (e.g., read operation, write operation, new operation, delete operation, rename operation). Values of various features or attributes (e.g., entropy, Monte Carlo pi estimate (MCPI), Monte Carlo pi estimation error (MCPIE), arithmetic mean, chi square, serial correlation coefficient (SCC)) of the file(s) associated with each sample row of the known training dataset are obtained or calculated. Out of the obtained features, specific contributing features, both singular and combinatorial (e.g., singular or combinations of entropy, MCPI, MCPIE, arithmetic mean, chi square, SCC, and the like) that exhibit a high degree of correlation with a desired output (e.g., prediction operation identifying ransomware) are identified using statistical techniques (e.g., design of experiments (DoE)) and values (or value sets) of the specific singular or combinatorial contributing features are obtained for the training dataset to train one or more data analytics models for the different combinations of file types and log event types.

The data analytics model (e.g., machine learning or deep learning model) may be an ensemble model of a random forest model and partial least squares regression model each of which is for a different combination of file type and log event type and which assigns respective coefficients based on respective training dataset to the respective specific singular or combinatorial contributing features. After training and testing, the data analytics model is deployed to perform a prediction operation, classification operation, decision operation or regression operation on field data based on the coefficients and mathematical functions of the model for determining, for example, whether or not data manipulation associated with a file indicates a malignant file change. Prior to the (unauthorized) encrypted version of the file is written to disk, the system may prompt a user to revert back to the original (e.g., unencrypted) version of the file to prevent data loss. Alternately, once a determination of malicious behavior is made, the system may prompt a user to restore a backup of the original file prior to any malicious modifications. The deployed model may monitor and inspect file system events having predetermined file types and log event types. File system event stream data of one or more file system events indicating data manipulation associated with a file may be processed to obtain the feature values of different feature combinations of the plurality of features (e.g., entropy, MCPI, MCPIE, arithmetic mean, chi square, SCC, or combinations thereof) of the file and the obtained values may be input to the analytics model which may assign a coefficient to each different feature combination based on the corresponding training dataset of the file type and the log event type and the mathematical functions underlying the analytics model. The model may be a part of an ensemble model that may then, for example, output a prediction regarding whether the mathematical transformation of data associated with the file indicates it is being changed malignantly (e.g., encrypted by ransomware).

Referring now to FIG. 1, a block diagram illustrates a programmable device 100 that may be used for implementing the techniques described herein in accordance with one or more embodiments. The programmable device 100 illustrated in FIG. 1 is a multiprocessor programmable device that includes a first processing element 170 and a second processing element 180. While two processing elements 170 and 180 are shown, an embodiment of programmable device 100 may also include only one such processing element.

Programmable device 100 is illustrated as a point-to-point interconnect system, in which the first processing element 170 and second processing element 180 are coupled via a point-to-point interconnect 150. Any or all of the interconnects illustrated in FIG. 1 may be implemented as a multidrop bus rather than point-to-point interconnects.

As illustrated in FIG. 1, each of processing elements 170 and 180 may be multicore processors, including first and second processor cores (i.e., processor cores 174a and 174b and processor cores 184a and 184b). Such cores 174a, 174b, 184a, 184b may be configured to execute instruction code. However, other embodiments may use processing elements that are single core processors as desired. In embodiments with multiple processing elements 170, 180, each processing element may be implemented with different numbers of cores as desired.

Each processing element 170 and 180 may include at least one shared cache 146. The shared cache 146a, 146b may store data (e.g., instructions) that are utilized by one or more components of the processing element, such as the cores respectively. For example, the shared cache may locally cache data stored in a memory 132, 134 for faster access by components of the processing elements 170, 180. In one or more embodiments, the shared cache 146a, 146b may include one or more mid-level caches, such as level 2 (L2), level 3 (L3), level 4 (L4), or other levels of cache, a last level cache (LLC), or combinations thereof.

While FIG. 1 illustrates a programmable device with two processing elements 170, 180 for clarity of the drawing, the scopes of the present inventions are not so limited and any number of processing elements may be present. Alternatively, one or more of processing elements 170, 180 may be an element other than a processor, such as a graphics processing unit (GPU), a digital signal processing (DSP) unit, a field programmable gate array, or any other programmable processing element. Processing element 180 may be heterogeneous or asymmetric to processing element 170. There may be a variety of differences between processing elements 170, 180 in terms of a spectrum of metrics of merit including architectural, microarchitectural, thermal, power consumption characteristics, and the like. These differences may effectively manifest themselves as asymmetry and heterogeneity amongst processing elements 170, 180. In some embodiments, the various processing elements 170, 180 may reside in the same die package.

First processing element 170 may further include memory controller logic (MC) 172 and point-to-point (P-P) interconnects 176 and 178. Similarly, second processing element 180 may include a MC 182 and P-P interconnects 186 and 188. As illustrated in FIG. 1, MCs 172 and 182 couple processing elements 170, 180 to respective memories, namely a memory 132 and a memory 134, which may be portions of main memory locally attached to the respective processors. While MC logic 172 and 182 is illustrated as integrated into processing elements 170, 180, in some embodiments the memory controller logic may be discrete logic outside processing elements 170, 180 rather than integrated therein.

Processing element 170 and processing element 180 may be coupled to an I/O subsystem 190 via respective P-P interconnects 176 and 186 through links 152 and 154. As illustrated in FIG. 1, I/O subsystem 190 includes P-P interconnects 194 and 198. Furthermore, I/O subsystem 190 includes an interface 192 to couple I/O subsystem 190 with a high performance graphics engine 138. In one embodiment, a bus (not shown) may be used to couple graphics engine 138 to I/O subsystem 190. Alternately, a point-to-point interconnect 139 may couple these components.

In turn, I/O subsystem 190 may be coupled to a first link 116 via an interface 196. In one embodiment, first link 116 may be a Peripheral Component Interconnect (PCI) bus, or a bus such as a PCI Express bus or another I/O interconnect bus, although the scopes of the present inventions are not so limited.

As illustrated in FIG. 1, various I/O devices 114, 124 may be coupled to first link 116, along with a bridge 118 that may couple first link 116 to a second link 120. In one embodiment, second link 120 may be a low pin count (LPC) bus. Various devices may be coupled to second link 120 including, for example, a keyboard/mouse 112, communication device(s) 126 (which may in turn be in communication with the computer network 103), and a data storage unit 128 such as a disk drive or other mass storage device which may include code 130, in one embodiment. The code 130 may include instructions for performing embodiments of one or more of the techniques described herein. Further, an audio I/O 124 may be coupled to second link 120.

Note that other embodiments are contemplated. For example, instead of the point-to-point architecture of FIG. 1, a system may implement a multi-drop bus or another such communication topology. Although links 116 and 120 are illustrated as busses in FIG. 1, any desired type of link may be used. In addition, the elements of FIG. 1 may alternatively be partitioned using more or fewer integrated chips than illustrated in FIG. 1.

Figure 2:
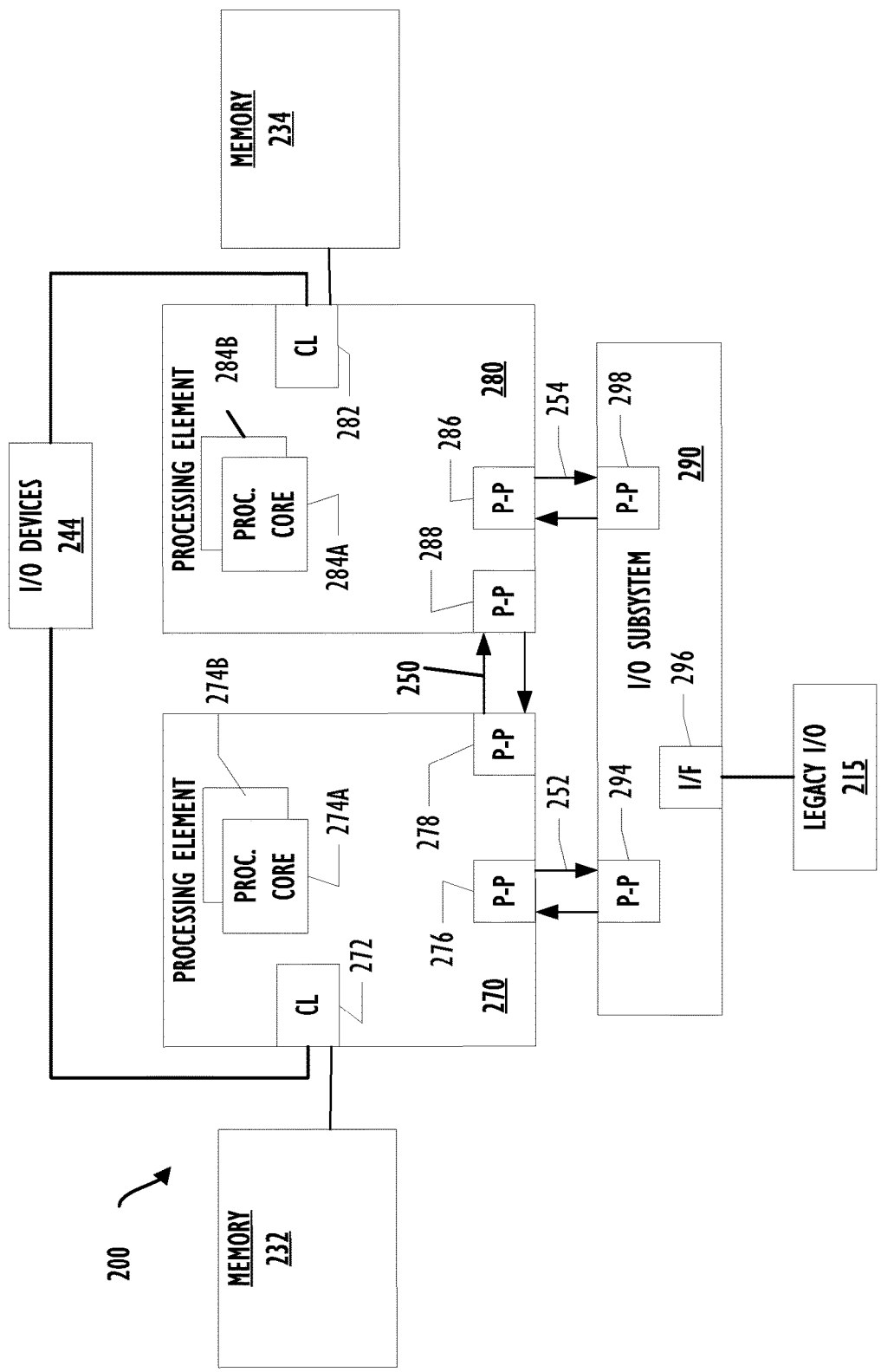

Referring now to FIG. 2, a block diagram illustrates a programmable device 200 according to one or more embodiments. Certain aspects of FIG. 2 have been omitted from FIG. 2 in order to avoid obscuring other aspects of FIG. 2.

FIG. 2 illustrates that processing elements 270, 280 may include integrated memory and I/O control logic ("CL") 272 and 282, respectively. In some embodiments, the 272, 282 may include memory control logic (MC) such as that described above in connection with FIG. 1. In addition, CL 272, 282 may also include I/O control logic. FIG. 2 illustrates that not only may the memories 232, 234 be coupled to the CL 272, 282, but also that I/O devices 244 may also be coupled to the control logic 272, 282 Legacy I/O devices 215 may be coupled to the I/O subsystem 290 by interface 296. Each processing element 270, 280, may include multiple processor cores, illustrated in FIG. 2 as processor cores 274A, 274B, 284A and 284B. As illustrated in FIG. 2, I/O subsystem 290 includes point-to-point (P-P) interconnects 294 and 298 that connect to P-P interconnects 276 and 286 of the processing elements 270 and 280 with links 252 and 254. Processing elements 270 and 280 may also be interconnected by link 250 and interconnects 278 and 288, respectively.

The programmable devices depicted in FIGS. 1 and 2 are schematic illustrations of embodiments of programmable devices that may be utilized to implement various embodiments discussed herein. Various components of the programmable devices depicted in FIGS. 1 and 2 may be combined in a system-on-a-chip (SoC) architecture.

Figure 3:
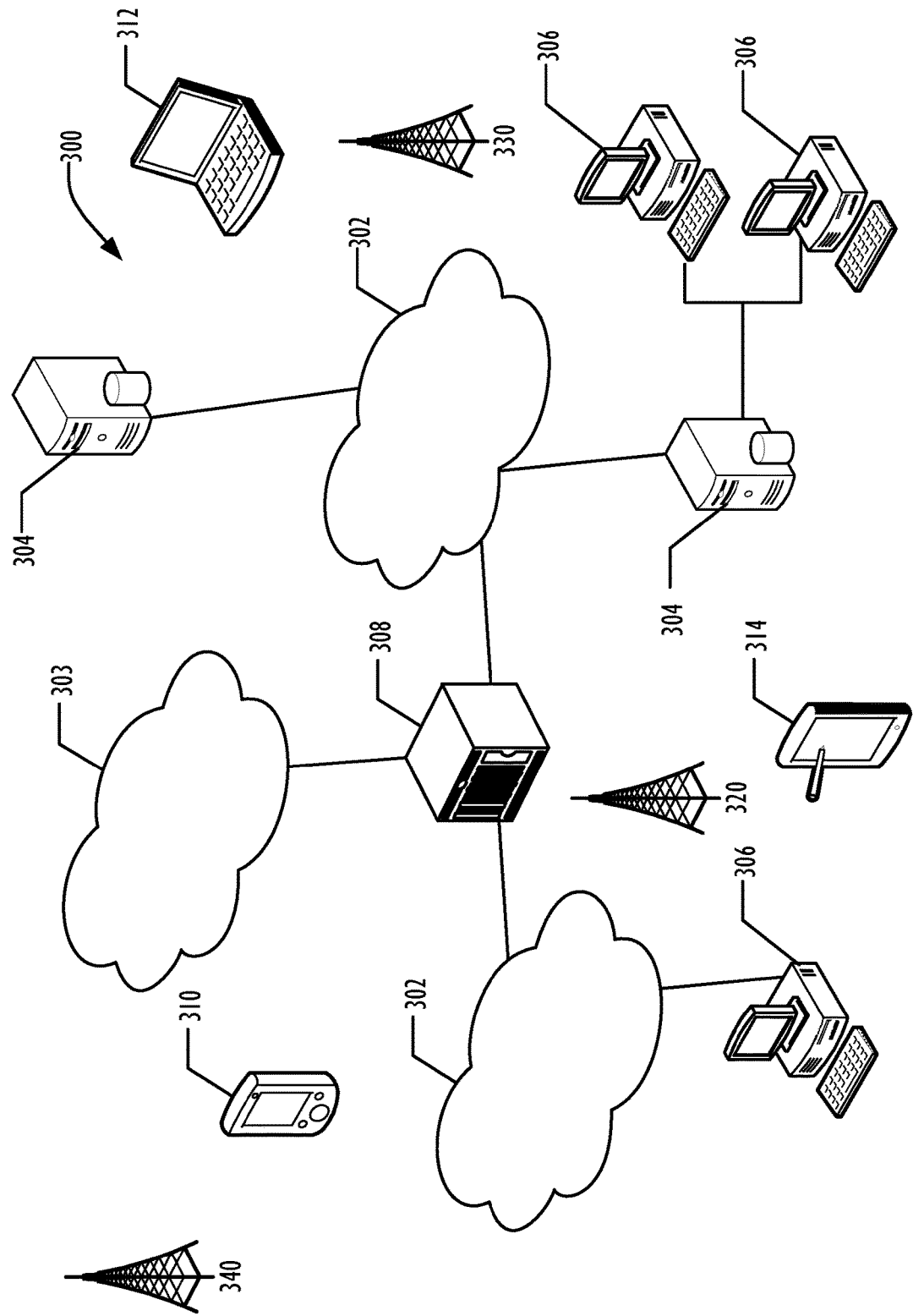
FIG. 3 is a block diagram illustrating a network of programmable devices that may be used as an ecosystem according to one or more embodiments disclosed herein.

Referring now to FIG. 3, an example ecosystem 300 in which the techniques described above and herein may be implemented is illustrated schematically. Ecosystem 300 contains computer networks 302. Computer networks 302 may include many different types of computer networks available today, such as the Internet, a corporate network or a Local Area Network (LAN). Each of these networks can contain wired or wireless programmable devices and operate using any number of network protocols (e.g., TCP/IP). Networks 302 may be connected to gateways and routers (represented by 308), end user computers 306, and computer servers 304. Ecosystem 300 also includes cellular network 303 for use with mobile communication devices. Mobile cellular networks support mobile phones and many other types of mobile devices. Mobile devices in ecosystem 300 are illustrated as mobile phones 310, laptops 312 and tablets 314. A mobile device such as mobile phone 310 may interact with one or more mobile provider networks as the mobile device moves, typically interacting with a plurality of mobile network towers 320, 330, and 340 for connecting to cellular network 303. Although referred to as a cellular network in FIG. 3, a mobile device may interact with towers of more than one provider network, as well as with multiple non-cellular devices such as wireless access points and routers 308. In addition, the mobile devices 310, 312 and 314 may interact with non-mobile devices such as computers 304 and 306 for desired services.

Mathematical models (e.g., data analytics, machine learning, deep learning models, and/or artificial intelligence) may be deployed anywhere in ecosystem 300, and the statistical techniques and data analytics (e.g., prediction, classification, decision or regression) disclosed herein may be performed where the models are deployed or elsewhere in ecosystem 300. In one embodiment, the model may be deployed at an end point (e.g., end user computer 306) as part of a software application running in the background on the end point and monitoring all activity to identify and halt malware before the malware malignantly changes a file. The statistical techniques to develop and train the model may be employed at the end point or elsewhere in ecosystem 300. For example, the statistical techniques may be employed at a service operations center on ecosystem 300 and once the model is trained and tested, the model may be deployed at each endpoint of ecosystem 300 as part of a suite of cybersecurity software applications.

FIG. 4 shows dataflow graph 400 of model development and application for data analytics according to one or more embodiments disclosed herein. Known dataset 405 is used to build mathematical model 425 (e.g., data analytics model, machine or deep learning model, ensemble model, and/or artificial intelligence) for making data-driven predictions, classifications, decisions or for performing regression analysis. In one embodiment, known dataset 405 may be ransomware data of known ransomware threats and may be specific to a combination of a predetermined file type and a predetermined log event type. Thus, multiple known datasets 405, each for a specific combination of a file type and a log event type may be used for training multiple models. The predetermined file type may be a document file type, an image file type, audio/video file types, database file types, and the like. Exemplary file types include, but are not limited to, word processing file types (e.g., doc, docx, rtf), spreadsheet or workbook file types (e.g., xls, xlsx), presentation file types (e.g., ppt, pptx), page description language file types (e.g., PCL, PostScript, PDF, XPS, or the like), database file types (e.g., mdb, accdb), image file types (e.g., png, jpg, gif, tif, bmp, ppm, xpm), plain text, pdf file type, and the like. The predetermined log event type (i.e., operation type of access) may include any data access event affecting data stored on a storage device. For example, the predetermined log event type may include an operation to create (i.e., new), read, write (i.e., modify), delete, and/or rename a file. Since training dataset 410 includes data having the file type and log event type that matches that of the file (i.e., field data) being inspected, a model that is more accurate in predicting malware or ransomware affecting the file can be trained.

Known dataset 405 includes known features and known responses used to train, validate and test a model that is then deployed as mathematical model 425 in the field to make predictions or decisions related to a process or system. Programmable device 100 (or programmable device 200; processing unit) may subject known dataset 405 to pre-processing to clean and prepare the data to make it suitable for consumption by model training algorithms. For example, the data may be visualized and analyzed to run sanity checks to validate the quality of the data and to understand the data. Known dataset 405 may include variables and features that are attributes of examples that can be used to identify patterns to predict a target answer. Known dataset 405 may further include associated data that is stored in association with the variables and features of the examples and that is labeled as a target (correct answer) that the algorithm is intended to learn from and predict.

After training and testing, mathematical model 425 predicts this answer (e.g., ransomware or not ransomware) on field data for which the target answer is not known. Programmable device 100 may further subject known dataset 405 to feature processing to make the features and variables of the dataset more meaningful. Feature processing may include forming more generalizable data points to learn from to provide significant improvements to the predictive or diagnostic model. Common types of feature processing performed on the data may include replacing missing or invalid data, forming Cartesian products of one variable with another, and non-linear transformations. Examples of the features and variables that may be included in known dataset 405 for each row of sample known dataset 405 are illustrated as feature candidates in table 500 shown in FIG. 5. One or more of the features (e.g., entropy, chi square, MCPI, MCPIE, arithmetic mean, SCC, and the like) shown in FIG. 5 may represent mathematical attributes of a file whose values are obtained by performing mathematical transformations on data file(s) associated with the corresponding row of sample known dataset 405. For example, the mathematical values of the exemplary features may be calculated by programmable device 100 by performing processing on data file(s) associated with the corresponding row of sample known dataset 405. In one embodiment, the mathematical values of the exemplary features may be calculated using statistical analysis software (e.g., JMP®, SAS Institute Inc.) to reveal insights from known dataset 405.

As shown in FIG. 5, a feature may correspond to an original version of the file (e.g., 2. File original entropy), prior to data manipulation due to execution of a process (e.g., encryption by a malicious script) or the feature may correspond to a modified version of the file (e.g., 13. File ending entropy), after the data manipulation. Further, only a predetermined portion of the file may be considered for obtaining the mathematical value associated with that feature. For example, one feature may be a mathematical value of an original file entropy that is obtained based on only the first 4K bits of the original file. Another feature may be a mathematical value of an original file entropy that is obtained based on only the last 4K bits of the original file. Yet another feature may be a mathematical value of an ending file entropy that is obtained based on only the first 4K bits of the result file (i.e., modified version of the file after the data manipulation due to the execution of the process). And yet another feature may be a mathematical value of an ending file entropy that is obtained based on only the last 4K bits of the result file.

Programmable device 100 may use statistical techniques to identify, from the example feature candidates and variables for each row of data in known dataset 405 as shown in FIG. 5, specific contributing features, singular and/or combinatorial, that exhibit a high degree of correlation with a desired output (e.g., prediction operation for identifying ransomware) for each file type and log event type combination. For example, statistical analysis software (e.g., JMP®, SAS Institute Inc.) may be used to conduct a design of experiments (DoE) on known dataset 405 to understand the interaction of the different features (e.g., feature candidates shown in FIG. 5) on output. DoE is a known method in statistics to identify all factors and combinations of those factors that impact the output. That is, DoE is a systematic approach to varying the input controllable variables (features) in the process and analyzing the effects of these process variables on the outputs (or predictions). Using DoE, and with known dataset 405 including features and target label values as input, programmable device 100 may identify specific combinations of the features that exhibit a high degree of correlation with the desired output (i.e., target label value of known dataset 405 or the value to be predicted in field data). Since known dataset 405 is organized based on data for specific file types and log event types, and since the DoE is also conducted based on the input known dataset 405 having specific file type and log event type, the output of the DoE of the specific singular or combinatorial contributing features highly correlated to the desired output is also specifically correlated to the file type and log event type combination for a file of field data. As a result, overall accuracy of the mathematical model 425 that is trained with the singular or combinatorial contributing features as input for performing prediction, classification or regression operations on field data having the specific file type and log event type is increased. Exemplary output of the DoE is shown in FIG. 6.

FIG. 6 shows table 600 illustrating exemplary combinations of the specific contributing features that are derived for specific file types and log event types according to one or more embodiments disclosed herein. As explained above, highly contributing feature combinations may be derived using DoE in which input features and combinations are varied to analyze the effects of these features and combinations on a desired output. For example, if the number of features (e.g., feature candidates of FIG. 5) input to the DoE is N, factorial N (i.e., N!) singular and combinatorial features are considered by the DoE to determine, out of the N! singular and combinatorial features, those singular and/or combinatorial features that have the highest correlation with the desired output. The combinatorial features with the highest correlation are illustrated in the example table 600 with an asterisk (*) in the "Prob>ChiSquare" column (i.e., combinatorial features listed in the top six rows of table 600). For the top six rows of table 600, the probability that the corresponding combination of features is greater than chi-square is a test of 'goodness' of the combination compared to the rest of the combinations (i.e., whether the combination is a contributor or highly correlated indicator of the desired output). Thus, the first combinatorial feature identified by the DoE is the combination of: (i) MCPIE obtained based on the starting 4K bits of the file; (ii) SCC obtained based on the starting 4K bits of the file; (iii) MCPI obtained based on ending 4K bits of the file; and (iv) MCPIE obtained based on ending 4K bits of the file, all input together into a model for training as one combination. The second combinatorial feature identified by the DoE is the combination of: (i) entropy obtained based on the starting 4K bits of the file; (ii) MCPI obtained based on the starting 4K bits of the file; and (iii) SCC obtained based on the starting 4K bits of the file, all input together into a model for training as one combination. The exemplary data shown in table 600 is based on input known dataset 405 having a specific file type and a log event type of creating a new file. Thus, in the exemplary data shown in table 600, the combinatorial features all correspond to the created new file (instead of original and modified versions of a file). Similar combinatorial features can be derived using the DoE when the log event type is read, write (i.e., update or modify), delete, rename and the like, where there may be more than one versions of the same file (i.e., original and modified versions of the file).

After deriving the singular or combinatorial contributing features for specific file types and log event types, programmable device 100 may obtain mathematical values (or value sets) for the singular or combinatorial contributing features for each row of the sample known dataset 405 based on corresponding original and/or modified files. In one embodiment, the mathematical values (or value sets) of the singular or combinatorial contributing features may be calculated using statistical analysis software (e.g., JMP®, SAS Institute Inc.).

Returning to FIG. 4, after above pre-processing, programmable device 100 may split known dataset 405 for each file type and log event type combination into training (or validation) dataset 410 and test dataset 415 in order to evaluate (i.e., evaluation 420) a model associated with training dataset 410 to estimate the quality of its pattern generalization for data the model has not been trained on. That is, since future data instances (i.e., field data) have unknown target values that cannot be used for checking accuracy of predictions of mathematical model 425, some of the data from known dataset 405 for which we already know the answer of the prediction target for each row is used to evaluate the accuracy of model (and underlying algorithm). For example, 70-80% of known dataset 405 may be used for training by training dataset 410 and 20-30% may be used for testing by test dataset 415. Programmable device 100 may use data in training dataset 410 to train models to see patterns and use data in test dataset 415 to evaluate predictive quality of the trained model. Programmable device 100 may use data in multiple training datasets 410 of different combinations of file types and log event types to train multiple respective models based on respective contributing combinatorial features by applying different respective classifiers and algorithms in order to develop models that are highly correlated to the desired output for the corresponding combination of file type and log event type. The multiple different models may be combined to create mathematical model 425 as an ensemble model (i.e., model of models). That is, programmable device 100 may run two or more related but different analytical models (i.e., multiple classifiers or algorithms for the problem to be solved by the model) for different combinations of file types and log event types and then synthesize them into an ensemble model in order to improve the accuracy of predictive analytics and data mining application of mathematical model 425 for specific combinations of file types and log event types. Alternately, training dataset 410 may be used to train a generic model (mathematical model 425) for different file types and log event types. Programmable device 100 may use test dataset 415 to perform evaluation 420 by obtaining performance characteristics such as accuracy, sensitivity, specificity, F-measure and the like of the selected algorithms to fine tune mathematical model 425.

Programmable device 100 may further tune hyperparameters or training parameters to improve predictive performance of mathematical model 425. In one embodiment, the candidate algorithms may be supervised, unsupervised, semi-supervissed, or reinforcement machine learning algorithms depending on the characteristics of incoming data. For example, the machine learning algorithms used to train the model may be a naïve Bayes Classifier Algorithm, K Means Clustering Algorithm, Support Vector Machine Algorithm, Linear Regression, Logistic Regression, Artificial Neural Networks, Random Forests, Decision Trees, Nearest Neighbors, generalized linear algorithm, partial least squares (PLS) regression (either non-linear iterative partial least squares (NIPALS) or statistically inspired modification of partial least squares (SIMPLS)). In one embodiment, mathematical model 425 may be deployed as an ensemble model of random forest model and PLS regression model that take as input respective training datasets 410 and respective specific singular or combinatorial contributing features for specific combinations of file types and log event types derived by conducting DoE on known dataset 405 and features (i.e., feature candidates shown in table 500 of FIG. 5) thereof. Based on the algorithm employed for training the model using known dataset 405, the model assigns coefficients to each combinatorial contributing feature (for e.g., each of the six combinatorial features shown in FIG. 6) to create mathematical functions that assign different weights to the different combinatorial contributing features. Prediction operation on field data is then performed based on the created mathematical functions and the file type and log event type of field data. Each model may be a machine learning, deep learning, or artificial intelligence model that is designed to address a particular problem or answer a particular question (e.g., detect malware). However, the model need not be a machine learning model and could be any type of data analytics model where a data science approach is utilized and where accuracy of the desired output for a specific type of input is optimized. Once each unique singular or combinatorial feature set is identified for each combination of file type and log event type, an ensemble model of random forest and PLS using NIPALS or SIMPLS has demonstrated an accuracy rate of over 99%. Accuracy rate can be defined as specificity (false positive rate) and sensitivity (true positive rate) in a receiver operating characteristic curve (ROC), root mean square error, R-square, generalized R-square, or other appropriate error rates to optimize the model.

Before deploying mathematical model 425 in production, programmable device 100 may take steps to improve performance and accuracy of the model by improving model fit by determining whether the mathematical model 425 is overfitting or underfitting training dataset 410 by looking at prediction error on training dataset 410 and test dataset 415. The model is overfitting training dataset 410 when accuracy of training dataset 410 is higher than test dataset 415. Conversely, the model is underfitting training dataset 410 when the model performs poorly on training dataset 410. Programmable device 100 may indicate corrective action to achieve balanced model fit before mathematical model 425 is deployed in production. Once mathematical model 425 that performs well is deployed, the model may be used to make predictions on field dataset 430 to generate predicted responses 435. In one embodiment, programmable device 100 may make batch predictions using mathematical model 425 to generate predictions for a set of observations (incoming dataset) all at once and take action on a certain percentage of the observations. Alternately, programmable device 100 may generate predictions on a one-by-one basis in real-time for each example independent of the other examples based on incoming data.

Figure 7:
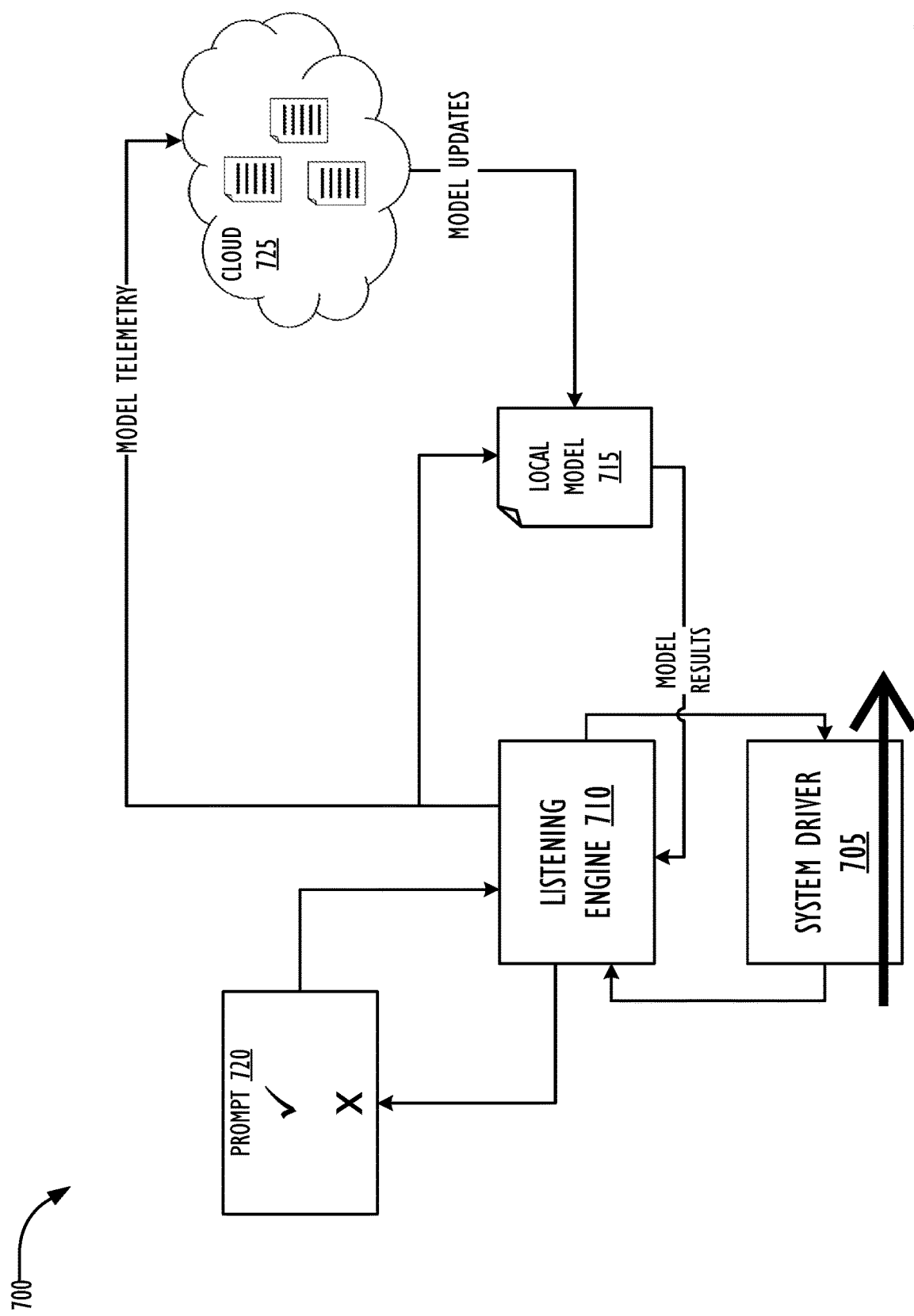
FIG. 7 shows a dataflow graph illustrating a general technique for data analytics that learns over time and identifies and halts ransomware according to one or more embodiments disclosed herein.

FIG. 7 shows dataflow graph 700 illustrating a general technique for data analytics that learns over time and that identifies and halts ransomware according to one or more embodiments disclosed herein. Mathematical model 425 of FIG. 4 may be deployed in production to perform a prediction or decision operation on incoming filed data as local model 715 of FIG. 7. Programmable device 100 may operate system driver 705 to run in the background on an end point and monitor all data activity to identify and halt malware. System driver 705 may act as a filtering engine for I/O operations and hook file system events on the end point to monitor the file system events for malicious activity. Each file system event may be associated with one or more files and may have a predetermined file type (e.g., doc, docx, rtf, xls, xlsx, ppt, pptx, PCL, PostScript, PDF, XPS, mdb, accdb, png, jpg, gif, tif, bmp, ppm, xpm, txt, and the like) and a predetermined log event type (e.g., create (i.e., new), read, write (i.e., modify), delete, rename, and the like). Not all file types and log event types may be monitored and programmable device 100 may detect occurrence of, from among the plurality of file system events, file system events having certain predetermined file types and predetermined log event types whose files are subject to comparison and inspection for malignant change. Programmable device 100 may trigger listening engine 710 to listen to file system event stream data of a file associated with the detection of the file system event. The file system event stream data may indicate data manipulation associated with the file due to execution of a process (e.g., malicious script or software code). When the log event type is a write operation, the stream data may include all pre-write operations before writing (i.e., modifying) of the file to disk (event coalescing). Similarly, the stream data may include all pre-delete, pre-rename, or pre-close or cleanup operations of the file. The stream data may further include a backup (or snapshot) of the original version of the file being modified and a final modified version of the file, before that file is stored onto a storage device. The final modified version of the file reflects all modifications (e.g., multiple write operations, rename operation, and the like) made to the file before attempting to write the file to disk. The final modified version may be stored in a temporary memory during the comparison and inspection of the file for malicious change. The file backup and other heuristics can be used to determine whether a file system event is malicious. Also, by comparing the backup with the final modified version of the file, before that file 'hits disk', since all of the changes that a malware is writing are completed, the comparison is significantly optimized and accuracy of malware detection is improved. Programmable device 100 may further obtain mathematical feature values (or value sets) of each of the plurality of specific combinatorial features (e.g., six top ranked combinations shown in FIG. 6) identified based on statistical techniques (e.g., DoE) for the specific file type and log event type and the corresponding file system event stream data. Programmable device 100 may then input the obtained combinatorial feature values to local model 715 for the model to make a prediction or decision based on the input combinatorial feature values. Local model 715 may apply coefficients of combinatorial features (corresponding to the file type and log event type) to input combinatorial feature values to output a signal that the system can use to determine whether the corresponding file is infected or manipulated by ransomware.

Programmable device 100 may input the signal output by local model 715 (i.e., model results) to listening engine 710. Listening engine 710 may include logic that determines whether the input signal meets a threshold condition that would classify the compared and inspected file corresponding to the file system event stream data as malware. In one embodiment, the threshold condition is determined based on confidence margins around the singular or combinatorial features. In another embodiment, the threshold condition is determined by utilizing ±3 sigma (standard deviation). Based on that determination, programmable device 100 may prompt 720 a user to either kill execution of the process performing the data manipulation associated with the file or allow the execution to continue. Programmable device 100 may also output to a user, a probability value indicating the percentage chance that the changes to a file are malignant. Based on the user's input, programmable device 100 may either allow the changed version of the file to overwrite the original version of the file in memory, or roll back the modified version with the backed up, original version of the file, thereby discarding malignant changes made to the file and preventing loss of data of the file. Thus, by comparing 'before' and 'after' versions of a file, taking a backup of the file and performing pre-write (or pre-delete, pre-rename, or the like) operations and using other heuristics, malware inspection is performed on the file without relying on any trust based model. The system remains agnostic to the process performing the data manipulation associated with the file and inspects the file to output a prediction based on mathematical transformation of the data itself, thereby improving accuracy and applicability of the model to new or undiscovered forms of malware. That is, without knowing or attempting to know anything about the actor making changes to a file, the system determines whether the changes are malignant based on the behavior of the file as indicated by mathematical properties of the file being modified.

In order to keep local model 715 (for each file type/log event type) predicting accurately over time, programmable device 100 may send model telemetry data of model detection (e.g., incoming field data, signal data output by model 715, user response to prompt 720, and the like) to an external device or system (or to cloud 725) for continuous learning and retraining of the model 715 with new training data over time (i.e., model update) and push new changes down to local model 715 to deploy the retrained (updated) model. In one embodiment, programmable device 100 may send model telemetry data periodically (e.g., daily, weekly, or monthly) to retrain and redeploy the model. The model may be retrained and redeployed periodically automatically or based on whether a data distribution of the local model training dataset 410 has deviated significantly from a data distribution of the model telemetry data.

EXAMPLES

The following examples pertain to further embodiments.

Example 1 is a computer system configured for halting malware, comprising: a memory; and one or more processors communicatively coupled to the memory, wherein the memory comprises instructions stored therein, the instructions when executed cause the one or more processors to: monitor a plurality of file system events with a system driver to detect an occurrence of a file system event of the plurality of file system events having a predetermined file type and a predetermined log event type; trigger a listening engine for file system event stream data of a file associated with the detection of the file system event, the file system event stream data indicating data manipulation associated with the file due to execution of a process; obtain one or more feature values for each of a plurality of different feature combinations of a plurality of features of the file based on the file system event stream data, the plurality of different feature combinations of the plurality of features being determined based on the predetermined file type and the predetermined log event type; input the one or more feature values into a data analytics model to predict a target label value, wherein the data analytics model predicts the target label value based on the one or more feature values of the plurality of different feature combinations and agnostic to the process performing the data manipulation associated with the file; and perform a predetermined operation based on the target label value.

Example 2 comprises the subject matter of Example 1, wherein the data manipulation comprises unauthorized encryption of the file by the process and wherein the computer instructions that cause the computer system to perform a predetermined operation based on the target label value comprise instructions that cause the computer system to: determine, based on the target label value, whether the file is getting manipulated by ransomware; and indicate a result of the determination to a user prior to the encryption.

Example 3 comprises the subject matter of Example 2, wherein the data analytics model is one of a random forest model and a partial least squares regression model that assigns a coefficient to each the plurality of different feature combinations based on a corresponding training dataset of the predetermined file type and the predetermined log event type and that outputs a signal to indicate, prior to the encryption, whether the file is getting manipulated by ransomware.

Example 4 comprises the subject matter of Example 1, wherein the one or more processors execute computer instructions that further cause the computer system to: store, in a storage device, an original version of the file responsive to the detection of the file system event; store, in a temporary memory, a modified version of the file modified by the data manipulation associated with the file due to the execution of the process; and update the original version of the file in the storage device with the modified version of the file based on the predicted target label value.

Example 5 comprises the subject matter of Example 4, wherein the data manipulation associated with the file is an asymmetric encryption process of encrypting the file with a public key.

Example 6 comprises the subject matter of Example 1, wherein the predetermined log event type indicates one of a read operation, a write operation, new operation, a delete operation, and a rename operation associated with the file, and wherein the predetermined file type is one of a document file type, a spreadsheet file type, and a presentation file type.

Example 7 comprises the subject matter of Example 1, wherein the plurality of features include two or more of: an original file entropy, an original file Monte Carlo pi estimate (MCPI), an original file Monte Carlo pi estimation error (MCPIE), an original file arithmetic mean, an original file chi square, an original file serial correlation coefficient (SCC), a modified file entropy, a modified file MCPI, a modified file MCPIE, a modified file arithmetic mean, a modified file chi square, and a modified file SCC.

Example 8 comprises the subject matter of Example 1, wherein the plurality of different feature combinations of the plurality of features are identified for the predetermined file type and the predetermined log event type based on a design of experiments.

Example 9 is a method for halting malware, comprising: monitoring, with one or more processors, a plurality of file system events with a system driver to detect an occurrence of a file system event of the plurality of file system events having a predetermined file type and a predetermined log event type; triggering, with the one or more processors, a listening engine for file system event stream data of a file associated with the detection of the file system event, the file system event stream data indicating data manipulation associated with the file due to execution of a process; obtaining, with the one or more processors, one or more feature values for each of a plurality of different feature combinations of a plurality of features of the file based on the file system event stream data, the plurality of different feature combinations of the plurality of features being determined based on the predetermined file type and the predetermined log event type; inputting, with the one or more processors, the one or more feature values into a data analytics model to predict a target label value, wherein the data analytics model predicts the target label value based on the one or more feature values of the plurality of different feature combinations and agnostic to the process performing the data manipulation associated with the file; and performing, with the one or more processors, a predetermined operation based on the target label value.

Example 10 comprises the subject matter of Example 9, wherein the data manipulation comprises unauthorized encryption of the file by the process and wherein performing a predetermined operation based on the target label value comprises: determining, with the one or more processors and based on the target label value, whether the file is getting manipulated by ransomware; and indicating, with the one or more processors, a result of the determination to a user prior to the encryption.

Example 11 comprises the subject matter of Example 10, wherein the data analytics model is one of a random forest model and a partial least squares regression model that assigns a coefficient to each the plurality of different feature combinations based on a corresponding training dataset of the predetermined file type and the predetermined log event type and that outputs a signal based on a predetermined threshold to indicate, prior to the encryption, whether the file is getting manipulated by ransomware.

Example 12 comprises the subject matter of Example 9, wherein the method further comprises: storing, with the one or more processors and in a storage device, an original version of the file responsive to the detection of the file system event; storing, with the one or more processors and in a temporary memory, a modified version of the file modified by the data manipulation associated with the file due to the execution of the process; and updating, with the one or more processors, the original version of the file in the storage device with the modified version of the file based on the predicted target label value.

Example 13 comprises the subject matter of Example 12, wherein the data manipulation associated with the file is an asymmetric encryption process of encrypting the file with a public key.

Example 14 comprises the subject matter of Example 9, wherein the predetermined log event type indicates one of a read operation, a write operation, new operation, a delete operation, and a rename operation associated with the file, and wherein the predetermined file type is one of a document file type, a spreadsheet file type, and a presentation file type.

Example 15 comprises the subject matter of Example 9, wherein the plurality of features include two or more of: an original file entropy, an original file MCPI, an original file MCPIE, an original file arithmetic mean, an original file chi square, an original file SCC, a modified file entropy, a modified file MCPI, a modified file MCPIE, a modified file arithmetic mean, a modified file chi square, and a modified file SCC.

Example 16 comprises the subject matter of Example 9, wherein the plurality of different feature combinations of the plurality of features are identified for the predetermined file type and the predetermined log event type based on a design of experiments.

Example 17 is a non-transitory computer readable medium storing a program for halting malware, comprising computer executable instructions stored thereon to cause one or more processing units to: monitor a plurality of file system events with a system driver to detect an occurrence of a file system event of the plurality of file system events having a predetermined file type and a predetermined log event type; trigger a listening engine for file system event stream data of a file associated with the detection of the file system event, the file system event stream data indicating data manipulation associated with the file due to execution of a process; obtain one or more feature values for each of a plurality of different feature combinations of a plurality of features of the file based on the file system event stream data, the plurality of different feature combinations of the plurality of features being determined based on the predetermined file type and the predetermined log event type; input the one or more feature values into a data analytics model to predict a target label value, wherein the data analytics model predicts the target label value based on the one or more feature values of the plurality of different feature combinations and agnostic to the process performing the data manipulation associated with the file; and perform a predetermined operation based on the target label value.

Example 18 comprises the subject matter of Example 17, wherein the data manipulation comprises unauthorized encryption of the file by the process and wherein the instructions that cause the one or more processing units to perform a predetermined operation based on the target label value comprise instructions that cause the one or more processing units to: determine, based on the target label value, whether the file is getting manipulated by ransomware; and indicate a result of the determination to a user prior to the encryption.

Example 19 comprises the subject matter of Example 18, wherein the data analytics model is one of a random forest model and a partial least squares regression model that assigns a coefficient to each the plurality of different feature combinations based on a corresponding training dataset of the predetermined file type and the predetermined log event type and that outputs a signal based on a predetermined threshold to indicate, prior to the encryption, whether the file is getting manipulated by ransomware.

Example 20 comprises the subject matter of Example 17, wherein the instructions further cause the one or more processing units to: store, in a storage device, an original version of the file responsive to the detection of the file system event; store, in a temporary memory, a modified version of the file modified by the data manipulation associated with the file due to the execution of the process; and update the original version of the file in the storage device with the modified version of the file based on the predicted target label value.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

It is to be understood that the above description is intended to be illustrative, and not restrictive. For example, the above-described embodiments may be used in combination with each other. Many other embodiments will be apparent to those of skill in the art upon reviewing the above description. The scopes of the inventions therefore should be determined with reference to the appended claims, along with the full scope of equivalents to which such claims are entitled.

What is claimed is:

1. An apparatus to detect and halt malware, the apparatus comprising:
   memory; and
   one or more processors to execute instructions that cause the one or more processors to:
      analyze an impact of feature candidates on a target malware prediction, the feature candidates to be associated with a predetermined portion of an original or modified file associated with a file system event, the predetermined portion of the original or modified file including at least one of a first portion of the original file, a first portion of the modified file, a last portion of the original file, or a last portion of the modified file;
      determine, using a design of experiments, singular or combinatorial features to be associated with a file system event based on the feature candidates; and
      determine a malware prediction based on the features associated with the file system event, the malware prediction associated with a predetermined operation.

2. The apparatus of claim 1, wherein the instructions, when executed, cause the one or more processors to assign weights to the features associated with the file system event based on the impact of the feature candidates on the target malware prediction.

3. The apparatus of claim 1, wherein the first portion of the original file is a first 4k bits of the original file, wherein the first portion of the modified file is a first 4k bits of the modified file, wherein the last portion of the original file is a last 4k bits associated with the original file, and wherein the last portion of the modified file is a last 4k bits associated with the modified file.

4. The apparatus of claim 1, wherein the feature candidates include an entropy of the predetermined portion of the original or modified file, a Monte Carlo pi estimate obtained based on the predetermined portion of the original or modified file, a Monte Carlo pi estimation error based on the predetermined portion of the original or modified file, a serial correlation coefficient associated with the predetermined portion of the original or modified file, a chi square associated with the original or modified file, or an arithmetic mean associated with the original or modified file.

5. The apparatus of claim 1, wherein the instructions, when executed, cause the one or more processors to:
   replace missing or invalid data associated with the file system event;
   determine Cartesian products between the feature candidates; and
   perform non-linear transformations associated with the feature candidates.

6. The apparatus of claim 1, wherein the instructions, when executed, cause the one or more processors to:
   receive model telemetry data periodically, the model telemetry data to include one or more of incoming field data, a signal data output by model, or a user response to a prompt; and
   determine whether a data distribution of the impact of the feature candidates on the target malware prediction deviates from the model telemetry data; and
   retrain the impact of the feature candidates on the target malware prediction in response to the data distribution of the impact of the feature candidates on the target malware prediction deviating from the model telemetry data.

7. An apparatus to detect and halt malware, the apparatus comprising:
   memory; and
   one or more processors to execute instructions that cause the one or more processors to:
      analyze an impact of feature candidates on a target malware prediction, the feature candidates to be associated with a predetermined portion of an original or modified file associated with a file system event;
      determine, using a design of experiments, singular or combinatorial features to be associated with the file system event based on the feature candidates;
      determine a malware prediction based on the features associated with the file system event, the malware prediction associated with a predetermined operation; and
      evaluate test data to determine whether the features associated with the file system event overfit training data, the features associated with the file system event to overfit the training data in response to an accuracy of the malware prediction being higher for the training data compared to the test data.

8. The apparatus of claim 7, wherein the instructions, when executed, cause the one or more processors to assign weights to the features associated with the file system event based on the impact of the feature candidates on the target malware prediction.

9. A method comprising:
   analyzing an impact of feature candidates on a target malware prediction, the feature candidates to be associated with a predetermined portion of an original or modified file associated with a file system event;

determining singular or combinatorial features to be associated with the file system event based on the feature candidates;

determining a malware prediction based on the features associated with the file system event, the malware prediction associated with a predetermined operation;

receiving model telemetry data periodically, the model telemetry data including one or more of incoming field data, a signal data output by model, or a user response to a prompt;

determining whether a data distribution of the impact of the feature candidates on the target malware prediction deviates from the model telemetry data; and retraining the impact of the feature candidates on the target malware prediction in response to the data distribution of the impact of the feature candidates on the target malware prediction deviating from the model telemetry data.

10. The method of claim 9, further including assigning weights to the features associated with the file system event based on the impact of the feature candidates on the target malware prediction.

11. The method of claim 9, wherein the predetermined portion of the original or modified file is associated with at least one of a first 4k bits of the original file, a first 4k bits of the modified file, a last 4k bits associated with the original file, a last 4k bits associated with the modified file.

12. The method of claim 11, wherein the feature candidates include an entropy of the predetermined portion of the original or modified file, a Monte Carlo pi estimate obtained based on the predetermined portion of the original or modified file, a Monte Carlo pi estimation error based on the predetermined portion of the original or modified file, a serial correlation coefficient associated with the predetermined portion of the original or modified file, a chi square associated with the original or modified file, or an arithmetic mean associated with the original or modified file.

13. The method of claim 9, further including evaluating test data to determine whether the features associated with the file system event overfit training data, the features associated with the file system event to overfit the training data in response to an accuracy of the malware prediction being higher for the training data compared to the test data.

14. The method of claim 9, further including:
replacing missing or invalid data associated with the file system event;
determining Cartesian products between the feature candidates; and
performing non-linear transformations associated with the feature candidates.

15. A non-transitory computer readable medium including computer executable instructions that, when executed, cause one or more processing units to at least:
analyze an impact of feature candidates on a target malware prediction, the feature candidates to be associated with a predetermined portion of an original or modified file associated with a file system event;

determine singular or combinatorial features to be associated with the file system event based on the feature candidates;

determine a malware prediction based on the features associated with the file system event, the malware prediction associated with a predetermined operation;

replace missing or invalid data associated with the file system event;

determine Cartesian products between the feature candidates; and perform non-linear transformations associated with the feature candidates.

16. The non-transitory computer readable medium of claim 15, wherein the instructions, when executed, cause the one or more processing units to assign weights to the features associated with the file system event based on the impact of the feature candidates on the target malware prediction.

17. The non-transitory computer readable medium of claim 15, wherein the predetermined portion of the original or modified file is associated with at least one of a first 4k bits of the original file, a first 4k bits of the modified file, a last 4k bits associated with the original file, a last 4k bits associated with the modified file.

18. The non-transitory computer readable medium of claim 17, wherein the feature candidates include an entropy of the predetermined portion of the original or modified file, a Monte Carlo pi estimate obtained based on the predetermined portion of the original or modified file, a Monte Carlo pi estimation error based on the predetermined portion of the original or modified file, a serial correlation coefficient associated with the predetermined portion of the original or modified file, a chi square associated with the original or modified file, or an arithmetic mean associated with the original or modified file.

19. The non-transitory computer readable medium of claim 15, wherein the instructions, when executed, cause the one or more processing units to evaluate test data to determine whether the features associated with the file system event overfit training data, the features associated with the file system event to over-fit the training data in response to an accuracy of the malware prediction being higher for the training data compared to the test data.

20. The non-transitory computer readable medium of claim 15, wherein the instructions, when executed, cause the one or more processing units to:
receive model telemetry data periodically, the model telemetry data including one or more of incoming field data, a signal data output by model, or a user response to a prompt;
determine whether a data distribution of the impact of the feature candidates on the target malware prediction deviates from the model telemetry data; and
retrain the impact of the feature candidates on the target malware prediction in response to the data distribution of the impact of the feature candidates on the target malware prediction deviating from the model telemetry data.

* * * * *